United States Patent [19]

Kiyokuni

[11] 4,032,988
[45] June 28, 1977

[54] COMPRESSED GAS FILLED CIRCUIT BREAKER

[75] Inventor: Nobuaki Kiyokuni, Kawasaki, Japan

[73] Assignee: Fuji Electric Company Ltd., Kawasaki, Japan

[22] Filed: Jan. 30, 1976

[21] Appl. No.: 653,866

[52] U.S. Cl. .......................... 361/115; 200/148 D; 361/156
[51] Int. Cl.² ........................................ H02H 3/00
[58] Field of Search ................... 317/33 C, 58, 151; 340/195, 416; 307/143; 200/145, 148 D

[56] References Cited

UNITED STATES PATENTS

| 3,532,843 | 10/1970 | Pucher | 200/148 D |
| 3,780,349 | 12/1973 | Nitta et al. | 317/151 X |

Primary Examiner—Harry E. Moose, Jr.
Attorney, Agent, or Firm—Sughrue, Rothwell, Mion, Zinn & Macpeak

[57] ABSTRACT

A compressed gas filled circuit breaker has electromagnetically controlled breaker switches located in a gas filled tank along with a secondary coil. Control circuitry including a capacitor is coupled to a primary coil and is located on the ground side of the circuit breaker.

2 Claims, 2 Drawing Figures

COMPRESSED GAS FILLED CIRCUIT BREAKER

BACKGROUND OF THE INVENTION

The present invention relates to a compressed gas filled circuit breaker and, particularly, to a circuit breaker of the so- called electromagnetic repulsion type in which a current due to the discharge of a capacitor flows through a driving coil which exerts an electromagnetic repulsive force on movable contacts to break the circuit.

The conventional circuit breaker of this type employs an insulator construction, and the energy stored in the capacitor for driving the contacts must be supplied through an insulating transformer from the energy source on the ground side of the breaker system. Also the control signal for causing discharge of the capacitor is transmitted by a photoelectric signal from the ground side to the high voltage side.

It is well known that insulating transformers are expensive. This disadvantage as well as the large size thereof becomes more severe when the rated voltage thereof is high because the number of connections is increased correspondingly. Further, the photoelectric system through which the control instruction is transmitted and converted is also expensive.

Recently the use of a circuit breaker employing the so- called tank type structure has been proposed. Such devices have anti-shock properties and durability due to the use of $SF_6$ gas which exhibits good attributes and causes rapid extinction of the arc.

It has been attempted to incorporate the former system, using an insulating transformer, with the latter tank type gas filled circuit breaker in order to obtain the advantages of the latter. However, the incorporation of an insulating transformer in the tank type gas filled circuit breaker has been difficult. It is very difficult to transmit energy to the high potential side because the size of the insulating transformer is large with respect to the size of the tank. Also since the control portion for controlling the discharge of the capacitor is positioned in the high potential side and hence inside the tank, the maintenance thereof is difficult. On the other hand should the energy be derived from the tank, high voltage bushings are required.

SUMMARY OF THE INVENTION

It is an object of the present invention to provide a tank type circuit breaker which is free of expensive insulating transformer and photoelectric control circuitry.

These and other objects of the invention are achieved by placing the capacitor and discharge element outside of the tank of gas and on the low potential side of the breaker and by coupling the discharge current from the capacitor to the switch contacts inside the tank by means of a primary and secondary coil.

DETAILED DESCRIPTION OF THE EMBODIMENT

Figure 1:
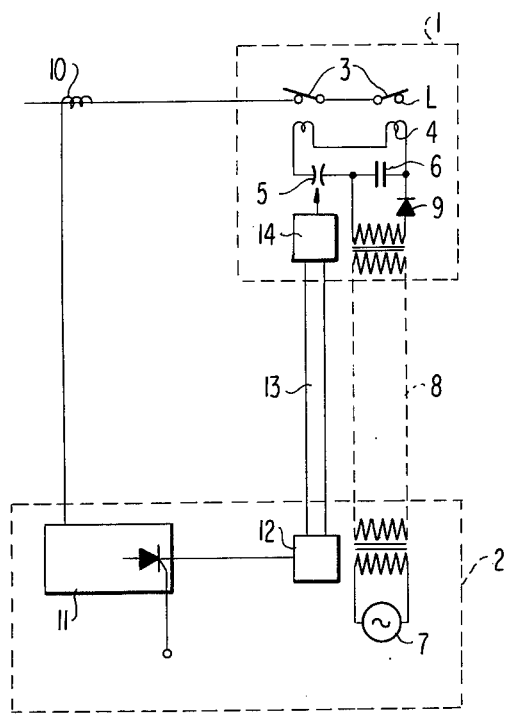
FIG. 1 is a schematic illustration of a conventional circuit breaker.

Referring to FIG. 1, which schematically shows the construction of a conventional insulator type synchronous circuit breaker, the circuit breaker comprises a high voltage circuit breaking chamber 1 and a support table 2 which may be grounded. The high voltage circuit breaking chamber 1 may be fixedly supported on the support table 2 by means of an insulater (not shown). The breaker chamber 1 houses a pair of contacts 3 connected in series to the circuit line L. Driving coils 4, which are electromagnetically coupled to contacts 3, respectively, are disposed adjacent to the movable contacts. The driving coils 4 are connected through a starting gap 5 to a capacitor 6 adapted to store energy for energizing coils 4 and driving the contacts 3. The capacitor 6 is charged thru a rectifier 9 by power source 7, disposed on the ground side of the circuit breaker, through a transformer 8.

When the condition on line L indicates that circuit breaking is necessary, this condition is sensed by coil 10 acting as a secondary, converted to an electrical pulse by synchronous detector 11, subsequently converted to an optical pulse by light emitter 12 and transmitted via optical guide means 13 to a light receiving means 14 where the pulse is reconverted to an electrical signal that initiates start gap 5. As shown in FIG. 1, the synchronous detector 11 and the light emitter 12 are disposed on the ground side, and the light receiving means 14 is disposed on the high potential side. The optical guide means 13 is housed together with the insulating transformer 8 in a supporting insulator (not shown). Both are necessary to provide functional interconnection while at the same time electrically insulating the ground and high voltage sides of the breaker.

When the electrical signal initiates the starting gap, the capacitor 6 is discharged to render a discharge current to flow through the driving coil 4. As a result, the contacts are opened due to the electromagnetic repulsive force.

In the construction of the conventional circuit breaker as mentioned above, it will be clear that the cost of the insulating transformer and the photoelectric conversion device is high and the insulating transformer makes it impossible to obtain the advantages of the tank type circuit breaker, as mentioned previously.

Figure 2:
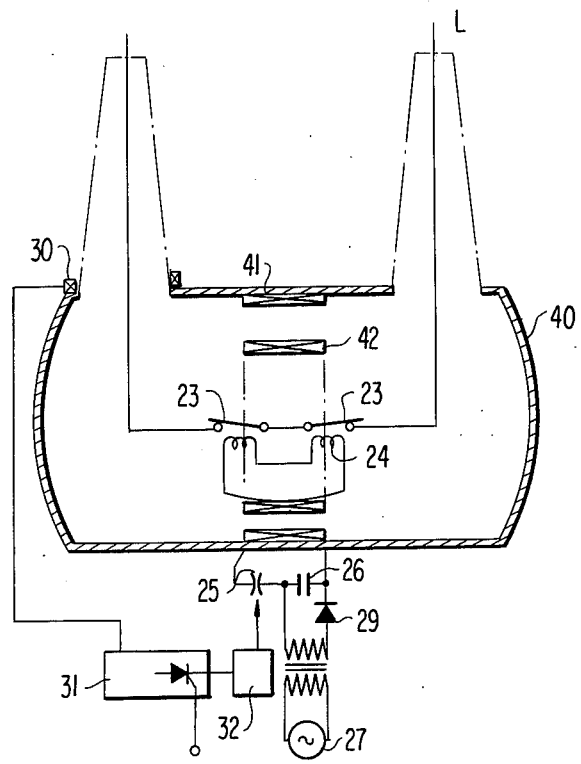
FIG. 2 is a schematic illustration of an embodiment of the present invention.

FIG. 2 shows a schematic construction of the present invention embodied in a tank type compressed gas filled circuit breaker. In FIG. 2, a pair of contacts 23, connected in series in the circuit line L, are disposed in a tank 40 filled with $SF_6$ gas and electrically grounded. Adjacent to the movable members of the contacts 23, a pair of driving coils 24 are disposed as in FIG. 1. The energy system for charging the capacitor 26 from the power source 27 through the rectifier 29 and discharging the capacitor through the starting gap 25 when instructed and the instruction system of the synchronous detection device 31 for providing the breaking instruction to the gap upon receipt of the output of the coil 30 are the same as those in FIG. 1. However, the starting gap 25, the capacitor 26 and the rectifier 29 are disposed on the ground side of the circuit breaker, and a primary coil 41 disposed on the ground side is connected to the capacitor. Further, a secondary coil 42 which is electromagnetically coupled to the primary coil 41 is provided on the high potential side in the tank 40. The secondary coil 42 is connected in series to the driving coil 24. Instead of the pulses for photoelectric conversion in FIG. 1, a pulse converting device 32 for converting the electrical signal from the synchronous detection device 31 into a high voltage pulse is connected to the output of the synchronous detection device 31. The primary coil is wound on the inner lining of the tank 40.

In operation, when a breaking instruction is supplied to the starting gap 25, the capacitor 26 is discharged and the discharge current flows through the primary coil 41. Therefore, due to the electromagnetic coupling between the primary coil and the secondary coil 42, an induction current flows through the latter coil and the driving coil 24, to thereby open the circuit breaker as in FIG. 1.

In the present invention, the necessities of the insulating transformer for supplying electric power from the ground side to the capacitor and the photoelectric conversion device in the breaking instruction system are eliminated because the capacitor and the starting gap are located on the ground side of the circuit breaker. Therefore, the cost of the circuit breaker can be minimized and it becomes easy to realize the tank type circuit breaker employing the electromagnetic repulsion system as shown in FIG. 2.

What is claimed is:

1. A circuit breaker of the type having a high potential side and a ground side, at least one contact having a movable contact element, at least one corresponding driving coil disposed in the vicinity of said movable contact element, a capacitor for supplying a current to said at least one driving coil by discharging the energy stored therein to drive said movable contact element by an electromagnetic repulsive force acting between said movable contact element and said driving coil, to thereby open said contact, the improvement comprising said capacitor being disposed on said ground side, a transformer having a primary coil disposed on the ground side and connected to said capacitor, and a secondary coil disposed on the high potential side and connected to said driving coil and electromagnetically coupled to said primary coil, said contact, driving coil, primary and secondary coils being located inside a grounded tank filled with a compressed gas having arc suppression properties.

2. A circuit breaker as claimed in claim 1 further comprising electrical means having no optical portions for initiating the discharge of said capacitor in response to a circuit braking condition ocurring.

* * * * *